N. KAPLAN.
LAVATORY TRAY AND WATER MIXER.
APPLICATION FILED JUNE 27, 1917.

1,259,873.

Patented Mar. 19, 1918.

INVENTOR
Nathan Kaplan
BY
ATTORNEY

UNITED STATES PATENT OFFICE.

NATHAN KAPLAN, OF NEW YORK, N. Y.

LAVATORY-TRAY AND WATER-MIXER.

1,259,873.

Specification of Letters Patent.

Patented Mar. 19, 1918.

Application filed June 27, 1917. Serial No. 177,187.

*To all whom it may concern:*

Be it known that I, NATHAN KAPLAN, a citizen of the United States, and resident of the borough of Manhattan, county of New York, city and State of New York, have invented certain new and useful Improvements in Lavatory-Trays and Water-Mixers, of which the following is a specification.

This device is intended as a means for mixing hot and cold water, and for supporting articles or utensils required in connection with a lavatory.

The principal object of the invention is to provide a water mixing means which may be used in conjunction with discharge faucets for hot and cold water in places where mixing valves are not provided.

The description and operation of my device will be set forth as the specification progresses.

The following is what I consider a good means of carrying out my invention and the accompanying drawings should be considered for a complete understanding of the specification which follows:

In the drawings:—

Similar reference numerals indicate like parts in all of the figures where they appear.

Figure 1:
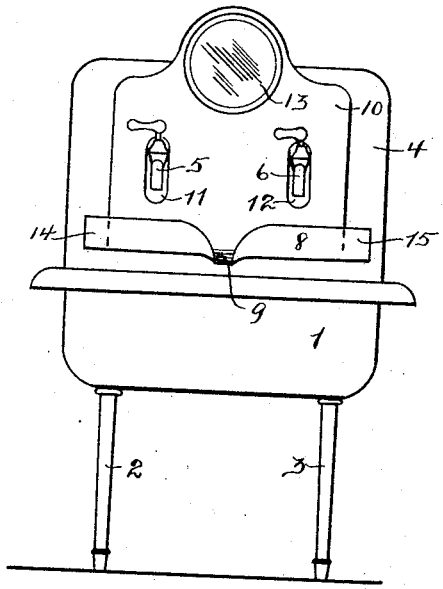
Figure 1 shows in front elevation a lavatory or sink with my device in position.
Figure 2:
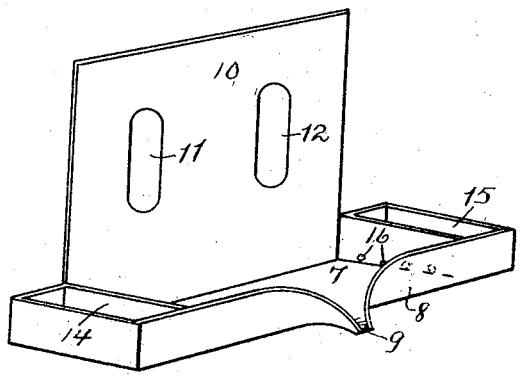
Fig. 2 is a perspective view of a device alone.

The lavatory or sink with which my device is used may be of ordinary construction and as it requires no revision or modification either in the sink or the water supply or drain, I will refer to it and the parts connected therewith in general terms.

The sink 1 is provided with supporting legs 2 and 3 and a suitable drain not shown.

A back or wash board 4, is usually arranged as a part of the sink, and through this back member 4 the faucets 5 and 6 project. In ordinary arrangement the faucet 5 is connected to a hot water supply and the faucet 6 to a cold water supply.

It is often found desirable to mix or blend the hot and cold water before their delivery into the sink or bowl, and to accomplish this in places where mixing valves are not provided, I have devised what I have termed a lavatory tray. The tray consists of a pan having a bottom member 7, and an upwardly extending front wall or member 8, into which and projecting from I arrange a delivery spout or nozzle 9.

Connected to or formed integral with the bottom 7, is a back plate 10, provided with elongated perforations 11 and 12, and in a complete demonstration of my invention I may arrange a mirror 13, high up in the back plate 10.

Adjacent to the ends of the member 7 and the front wall 8 are box members or pockets 14 and 15, each preferably formed integral with the members 7 and 8, and each of a depth about equal to the height of the front wall 8. The area of these boxes or pockets 14 and 15 may be changed at will, and I provide perforations 16 from the boxes 14 and 15 which will allow these boxes to be drained. The perforations are shown in the inner wall of each box member, but they may be provided through the bottom if preferred.

The sink or basin being arranged in any general manner, my tray is produced by having perforations 11 and 12 cut in a position to fit over the faucets 5 and 6. Generally the location of the perforations 11 and 12 is the only change that is necessary to make my device operate with any basin or sink, and when produced to fit properly the faucets 5 and 6 are passed through the perforations 11 and 12, and the tray supported by the upper edges of the perforations 11 and 12 resting upon the faucets. The device is now ready for operation.

The water is turned on and falls upon the bottom 7, and gathering thereon flows out through the spout 9.

The boxes 14 and 15 are provided as receptacles for soap, wash cloths or any other toilet articles, and are within convenient reach when my device is in use.

When not in use my device may be removed and supported from convenient hooks or laid aside, and its ready means of attachment and the conveniences offered by its use supply wants in excess of those possible with ordinary mixing faucets.

As shown by the drawings the shape and design of my device may be changed at will, the spacing between the faucets or between the perforations 11 and 12 may also be changed to meet special requirements, and other modifications may be made within the scope of the appended claims without departing from the principle or sacrificing the advantages of the invention.

Having carefully and fully described my invention what I claim and desire to secure by Letters Patent is:—

1. A device of the character described comprising a tray, means for supporting it upon a plurality of faucets, a box arranged at each end of said tray and draining into said tray and a delivery nozzle from said tray.

2. A device of the character described comprising a tray, a delivery nozzle in the front wall thereof, the back wall of said tray being provided with a plurality of elongated perforations spaced apart and adapted to engage upon a plurality of faucets and to be supported thereby, and a plurality of receptacles one at each end of said tray and formed integral therewith.

Signed at New York city, county and State of New York this 8th day of June. 1917.

NATHAN KAPLAN.

Witnesses:
G. E. S. MARR,
ARTHUR PHELPS MARR.

Copies of this patent may be obtained for five cents each, by addressing the "Commissioner of Patents, Washington, D. C."